Sept. 6, 1949.  A. NEUMANN  2,480,874
BUCKLE
Filed April 10, 1946  2 Sheets-Sheet 1
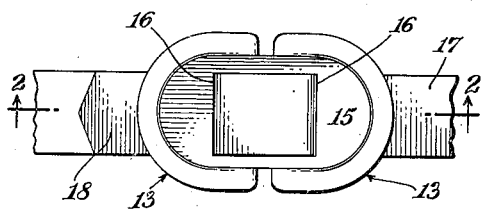
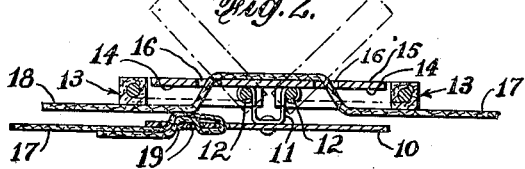
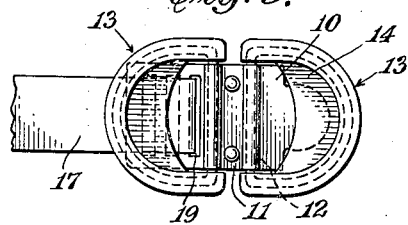
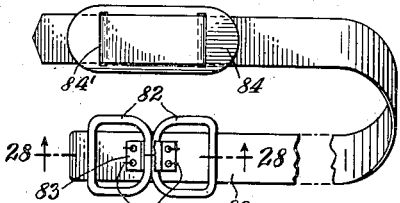
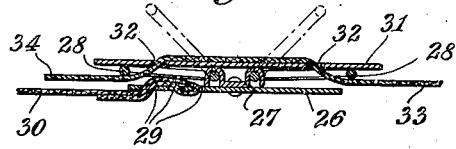
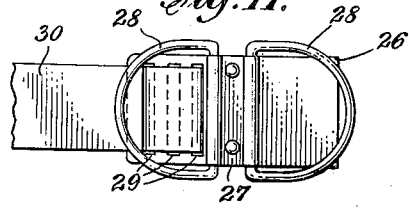
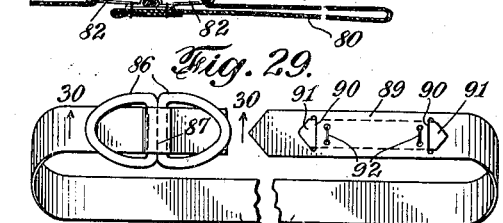
INVENTOR
Anna Neumann.
BY
Paul M Klein
ATTORNEY

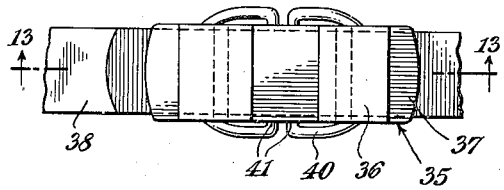
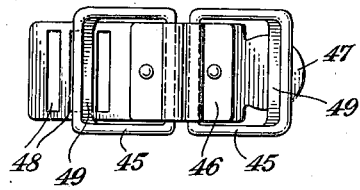
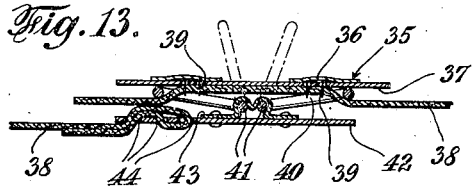
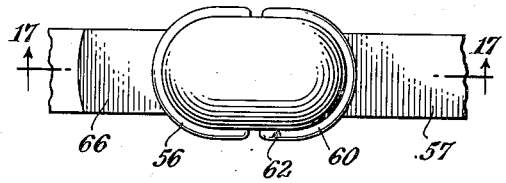
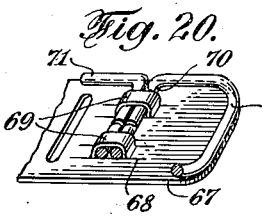
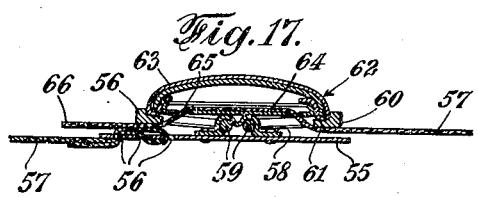
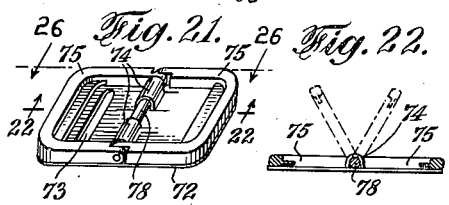
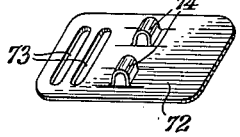
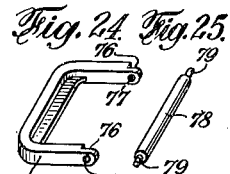
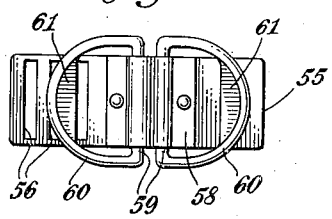
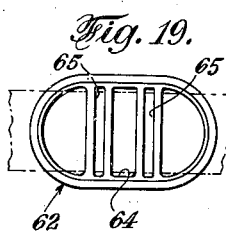
INVENTOR
Anna Neumann.
BY
his ATTORNEY Patented Sept. 6, 1949

2,480,874

UNITED STATES PATENT OFFICE 2,480,874

BUCKLE

Anna Neumann, Brooklyn, N. Y.

Application April 10, 1946, Serial No. 661,145

5 Claims. (Cl. 24—163)

1

The present invention relates to strap or belt buckles, wherein the usual adjusting means for the belt, consisting of a buckle prong and perforations in the belt for receiving the prong, are substituted by interlocking elements of the buckle structure, similar to the type of belt or strap fasteners disclosed in co-pending application Serial No. 622,517, filed October 16, 1945, now Patent No. 2,475,634, dated July 12, 1949.

While in the aforesaid co-pending application two relatively rigid cooperating elements are employed, wherein one element is adapted to pass through an aperture provided in the other element and then interlocks with that other element, the present development contemplates a novel arrangement of cooperating buckle elements wherein one, the lower element, is articulated, it being provided with movable parts, the other element being relatively rigid and being adapted to pass through one of the movable parts of the first mentioned element, whereby the interengagement of the two elements is greatly facilitated, especially when the buckle structure is of diminutive dimensions.

Generally speaking the present invention employs a base which may be either rigid or flexible, with which are hingedly associated at one face thereof two oppositely disposed loop members. In conjunction with this combined base and loop structure there is employed what may be termed a relatively rigid top member which is adapted to overlie or engage the hinged loops after having passed through at least one of the loops, said top member being adapted, when in final loop-engaging position, to urge the loops toward the base.

The employment of hinged loops in the present buckle structure facilitates the ready passage of the top member to which a strap or belt is attached, through one of the loops, while the strap end extending from the top member is passed through and under the other loop, whereupon the top member is placed in engaging or overlying position in respect to both loop elements. That feature has proven particularly advantageous in buckle structures for relatively narrow belts or straps such as used in connection with shoes and other commodities.

The present invention therefore has for its prime object the provision of a novel buckle structure wherein is provided a pliable or rigid base supporting a pair of cooperating loop elements pivotally secured to and operative in respect to but one face of the base, the base serving as limiting stop for the movement of the loop elements, and wherein a top member is provided which is adapted for passage through either of the loop elements prior to engaging both elements, and in which latter position the top member is intended to not only urge the elements toward the base, but to lock in place the strap or belt associated with the base and the top member.

Another object of the present invention is to provide in the base, means for either adjustably or fixedly attaching thereto a strap end, whereas the top member is designed to accommodate and to facilitate the adjustment of either the other end of the strap, or a corresponding strap end such as may be employed with shoes where two independent strap portions are provided.

Another object of the present invention is to so design the aforementioned loop elements that the top member cooperating with these elements may either rest within or partially or fully overlie, and therefore either partially or fully cover said elements.

The foregoing and a number of other objects and important advantages of the present invention will become more fully apparent from the ensuing description, in conjunction with the accompanying drawings, which latter illustrate several presently preferred forms of the buckle structure, presented for explanatory purposes only without intending to in any way limit this invention by the specific disclosures, and wherein:

Fig. 1 is a top view of one form of the buckle structure together with two strap portions;

Fig. 2 is a section taken on line 2—2 through Fig. 1;

Fig. 3 is a top plan view of the lower member of the buckle structure with one strap portion;

Fig. 4 is a top plan view of the top element of the buckle structure together with one strap portion;

Figs. 5, 6 and 7 are plan views of modified forms of the top member with one strap portion;

Fig. 8 is a section taken on line 8—8 through Fig. 7;

Fig. 9 illustrates a top plan view of another embodiment of the buckle structure together with two strap portions;

Fig. 10 is a section taken on line 10—10 through Fig. 9 also showing two strap portions;

Fig. 11 is a top plan view of the base of a structure similar to that shown in Fig. 9 together with its hinged loop elements and also one strap portion;

Fig. 12 is a top plan view of another embodiment of the buckle structure;

Fig. 13 is a section taken on line 13—13 through Fig. 12;

Fig. 14 is a top plan view of a modified form of the structure shown in Fig. 12 with the top member removed, omitting the strap portions for purpose of better demonstration;

Fig. 15 is a sectional elevation of another modification of the base and loop structure in accordance with the present invention, omitting the strap portions for purpose of better demonstration;

Fig. 16 is a top view of a buckle structure wherein the top member sits within the loop elements, together with two strap portions;

Fig. 17 is a section taken on line 17—17 through Fig. 16, showing also two strap portions;

Fig. 18 is a top plan view of the base and loop arrangement of the form of the buckle structure shown in Fig. 17, omitting the strap portions for purpose of better demonstration;

Fig. 19 is a bottom plan view of the top element for the buckle structure shown in Fig. 18, one strap portion being indicated in dotted lines;

Fig. 20 shows a perspective top view of still another modification of the base and loop elements of the buckle structure, omitting the strap portion for purpose of better illustration;

Fig. 21 illustrates a perspective top view of another form of the buckle base and loop elements of the buckle structure, omitting the strap portion for purpose of better illustration;

Fig. 22 is a sectional elevation taken on line 22—22 through Fig. 21;

Fig. 23 is a perspective view of a base or bottom plate of the buckle employed in the buckle construction shown in Fig. 21;

Fig. 24 denotes a perspective top view of a loop element;

Fig. 25 is a perspective view of a pintlet used in the structure shown in Fig. 21;

Fig. 26 is an enlarged, partial cross section of the loop elements and their hinge arrangement taken along the lines 26—26 of Fig. 21;

Fig. 27 a perspective view of a strap provided with a buckle structure employing loop elements fixedly attached to the strap;

Fig. 28 is a section through the interengaged buckle structure taken on lines 28—28 of Fig. 27;

Fig. 29 is a perspective view of another embodiment of the buckle structure of the present invention intended for very narrow straps; and Fig. 30 is a section taken on lines 30—30 of Fig. 29 through the buckle structure shown in this figure in interengaged position.

Referring now specifically to the figures, and particularly to Figs. 1 to 4, inclusive, this buckle structure comprises a base or bottom member 10, to the top face of which is attached a mounting 11 in which are pivotally lodged the linear wire portions 12 of two symmetrically arranged loop elements 13. These elements are shown to be constructed from a wire core which is covered by either plastic, leather or any other suitable material. At the interior perimeters of the loop elements are provided ledges 14 adapted to accommodate and support top member 15. This top member has two slots 16, which accommodate the adjustable end portion of a belt or strap 17, the end 18 of which is slipped under and projects beyond the left-hand loop element. It will be observed that base 10 is also provided with a plurality of slots 19 for adjustably accommodating either the other end of strap 17; or the end of another strap, when two independent straps are employed, for instance, for closing the upper end of certain shoe models.

It will be observed that the strap is of a considerably lesser width than the interior width or clearance of loop elements 13. Top member 15 on the other hand corresponds approximately in width to that of the interior clearance of the elements. Thus top member 15 and strap 17 may readily pass through the loop elements. The passage of the top member and of the strap is facilitated by simply moving the loop elements to their swung-up position indicated in broken lines in Fig. 2. After the top member has passed through the right-hand loop element and strap end 18 is slipped through and under the left-hand loop element, the top member is then pressed against ledges 14 of the loop elements, whereby the latter are urged toward base 10. When the different parts of the buckle structure are thus arranged in their final, interengaging position, as indicated in Fig. 2, strap 17 is rendered immovable. When the length of the strap is properly adjusted for closing an article, for instance, a shoe, the interengagement of the buckle parts will effect such closing.

It will be observed that the shape of top member 15 corresponds to the interior contour of loop elements 13. In Figs. 1 to 4, the top member is provided with but two slots 16 for the reception of strap 17; however, any desired number of such slots may be arranged in the top member, as indicated in Figs. 5 and 6, where two pairs of slots 20 or three pairs of slots 21 are illustrated, respectively.

In Figs. 7 and 8 there is shown a top member 22 constructed from a plurality of superimposed layers 23 which are held together peripherally by edge binding 24. Again there are provided in the body of top member 22 slots 25 for accommodating belt or strap 17.

Referring now to Figs. 9, 10 and 11, there is illustrated a modified structure of the buckle arrangement. To base 26 is secured, by means of clip 27, a pair of cooperating loop elements 28 formed from wire stock. Their movement in downward direction is limited by the base, as may be clearly seen in Fig. 11. The base is provided with a plurality of slots 29 for accommodating a strap 30, the length of which may be adjusted. Top member 31 in this construction is in the form of a stamping provided with slots 32 through which passes a strap member 33, terminating at 34. The width dimension of the top member is such that it may pass through loops 28, but the length of the top member is far greater than the combined length of loop elements 28. In this construction therefore top member 31 overlies the loops and urges the latter against the base.

In observing Figs. 2 and 10 it will be noted that the hinged portions of the loop elements are spaced from one another. In Figs. 12 to 18, inclusive, modified structures are illustrated where the loop elements are brought closer together. Figs. 12 and 13 show a construction similar to that described in connection with Figs. 9 to 11, except that the strap is not adjustable in respect to the top member. The top or overlying element 35 in Figs. 12 and 13 is made from two layers, a centrally perforated upper and shorter sheet 36 and a lower, longer sheet 37. Both sheets 36 and 37 and strap 38 are permanently united by stitching 39, as clearly seen in Fig. 13. Loop elements 40 are hinged closely together at 41 and are secured to base 42 by means of a clip 43 riveted or welded to the base. The left-hand portion of the base again is provided with a series of slots 44 for accommodating the adjustable end of strap 38.

The loops indicated in the previously described figures are semi-circular. In Fig. 14 a substantially square or oblong design of the loop elements is shown at 45, which are attached by means of clip 46 to base 47, provided at the left-hand end with a series of slots 48 for accommodating the adjustable portion of a strap. It will be observed that ledges 49 are provided along the interior edges of the outer portions of loop elements 45.

In Fig. 15 there is illustrated a buckle structure comprising a flat base 50 and two loop elements 51, the hinged linear portions 52 of which are held within a flexible mounting 53, preferably sewed on at 54 or otherwise attached to the base. Such construction may be employed in connection with articles exposed to moisture, it being intended that both the loops as well as the base be made from plastic material and that the flexible material used for holding hinged parts 52 of the loops be also preferably made from moisture-impervious stock.

Referring now to Figs. 16 to 19, inclusive, there is disclosed a buckle structure employing a top member with concealed means for adjusting the strap. There is again employed a base 55 provided with slots 56 for accommodating and adjusting a strap 57. Secured to the base is a clip 58 holding the hinged ends 59 of loop elements 60. These loop elements are provided at their interior periphery with ledge formations 61 for accommodating top member 62. The latter is of a hollow structure and is preferably provided with an ornamental covering 63. At the interior of this top member there is arranged a frame 64 provided with slots 65 for accommodating and adjusting strap 57 which projects at 66 beyond the buckle structure. The width of member 62 corresponds to the interior opening of loops 60 so that the member may be readily passed through the loops when the latter are swung upwards from the base. When end 66 of the strap is passed through and under the left-hand loop, the top member is placed against ledges 61, in which position strap 57 is held against movement.

A modified construction of the base and loop elements is illustrated in Fig. 20, wherein the base 67 is pierced at 68 to facilitate the formation of ears 69 for the reception of hinged ends 70 of loop elements 71.

Another buckle structure is shown in Figs. 21 to 26, inclusive, wherein again is employed a base 72 provided at one end with the usual strap-engaging slots 73, and from which base are stamped out ears 74 for the reception of the hinged portion of loop elements 75. These loop elements are preferably constructed in the manner shown in Fig. 24. The free end portions of the elements are recessed at 76 and are perforated at 77. Two such loop elements are brought together, as seen in Fig. 21, and are hingedly connected by means of pintlet 78 projecting with its reduced ends 79 into perforations 77. Pintlet 78, of course, is first placed under ears 74 of the plate.

Referring now to Figures 27 and 28, there is illustrated a buckle structure wherein the lower portion of the buckle is directly secured to strap 80 by means of stitches or otherwise, as indicated at 81. This lower buckle portion comprises two loop elements 82, the hinged portions whereof are held against strap 80 by means of a clip 83. It will be observed that the outer parts of the loop elements 82 are broader than their hinged portions.

The top member of this construction is indicated at 84, and the adjustable strap end is passed through suitable slots 84' so that its end extends beyond member 84.

In connecting the two buckle portions with one another, one of the loop elements is lifted and strap 80 is passed through it. Then the other loop element is lifted and the end of the strap is passed through and under. When the two buckle members are in interengagement with one another, they assume the position shown in Fig. 28.

In Figures 29 and 30 another embodiment of the present invention is shown. There is indicated at 85 a relatively narrow strap, such as may be used with shoes. At one end of the strap there is attached the lower buckle member composing loop elements 86, which are preferably secured by stitching to the strap body, as clearly indicated at 87 and 88. The top member in this construction comprises the end portion 89 of the strap, which latter is pierced at 90 so as to provide slots for the reception of a relatively stiff member 91 which is passed through the slots so that its ends extend above the strap body. In order to prevent member 91 from disengaging the strap, it is preferably stitched down as indicated at 92.

The interengagement of the two buckle members is illustrated in Figure 30. It is accomplished by passing strap portion 89 first through one of the loop elements 86 and then through the other, and so adjusting member 91 in respect to the elements that its ends will rest upon the outer portions of these elements.

The fact that several forms of the present buckle arrangement are illustrated indicates the possibility of many structural variations in the device, all within the underlying principle of the present invention, that is the employment of hinged loop elements for facilitating the passage therethrough of a top member and of the strap or the like attached thereto, whereupon the top member is superimposed upon the loop elements, and in which position of the buckle parts, the strap attached to the buckle structure, that is to the base and to the top member, is held against movement.

While only relatively few embodiments of buckle structures are disclosed, be it understood that changes and improvements may be made therein, without departing from the broad scope of the invention as defined in the annexed claims.

I claim:

1. In a fastener for adjusting belts, straps or the like, a lower member and an upper member, at least one opening in the lower member which permits of threading the upper member through the lower member, the upper member resting on and at least partly overlapping both ends of the lower member in operative position, one strap portion immovably associated with one of said members in normal use of the fastener, another strap portion passing, always in the same direction, along the lower member and through the lower member, then passing along at least a part of the upper member, said another strap portion being immovably associated with the upper member during normal use of the fastener, said another strap portion again passing through the lower member, and finally along the lower member, thereby maintaining the upper member in said operative position, and at least one of said members comprising two oppositely disposed loops and a hinge device permitting the loops to swing from their substantially flat operative position into their inoperative position in which the loops form an acute angle.

2. In a fastener for adjusting belts, straps or the like, a lower member and an upper member, at least one opening in the lower member which permits of threading the upper member through the lower member, the upper member resting on and at least partly overlapping both ends of the lower member in operative position, one strap portion immovably associated with one of said members, another strap portion passing, always in the same direction, along the lower member and through the lower member, then along at least a part of the upper member, said another strap portion being immovably associated with the upper member during normal use of the fastener, said another strap portion again passing through the lower member and finally along the lower member, thereby maintaining the upper member in said operative position, and the lower member comprising two oppositely disposed loops and a hinge device permitting the loops to swing from their substantially flat operative position into their inoperative position in which the loops form an acute angle.

3. A fastener, as set forth in claim 1, in which said loop carrying member comprises a base plate, said hinge device is mounted on the base plate and said loops are secured to the hinge device.

4. A fastener, as set forth in claim 2, in which the upper member is fitted into said loops in operative position.

5. A fastener, as set forth in claim 2, in which the upper member overlies both loops in operative position.

ANNA NEUMANN.

REFERENCES CITED

The following references are of record in the file of this patent:

UNITED STATES PATENTS

| Number | Name | Date |
|---|---|---|
| 460,846 | Bussey | Oct. 6, 1881 |
| 635,768 | Goldsmith | Oct. 31, 1889 |
| 718,240 | Barr | Jan. 13, 1903 |
| 1,060,196 | Lukacs | Apr. 29, 1913 |
| 1,880,317 | Dews | Oct. 4, 1932 |
| 2,094,292 | Cousens | Sept. 28, 1937 |

FOREIGN PATENTS

| Number | Country | Date |
|---|---|---|
| 17,966 | Sweden | July 30, 1904 |